US009432615B2

(12) United States Patent
Miao et al.

(10) Patent No.: US 9,432,615 B2
(45) Date of Patent: Aug. 30, 2016

(54) ELECTRONIC DEVICE, DISPLAY SYSTEM AND IMAGE PROCESSING METHOD

(71) Applicant: Wistron Corporation, New Taipei (TW)

(72) Inventors: Pen-Tai Miao, New Taipei (TW); Ping-Hung Chen, New Taipei (TW); Fang-Wen Liao, New Taipei (TW); Li-Yu Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/521,474

(22) Filed: Oct. 23, 2014

(65) Prior Publication Data

US 2015/0256791 A1    Sep. 10, 2015

(30) Foreign Application Priority Data

Mar. 10, 2014    (TW) .............................. 103108247 A

(51) Int. Cl.
| | |
|---|---|
| *H04N 21/41* | (2011.01) |
| *H04N 7/01* | (2006.01) |
| *H04N 9/64* | (2006.01) |
| *H04N 21/414* | (2011.01) |
| *H04N 21/431* | (2011.01) |
| *H04N 21/4363* | (2011.01) |
| *H04N 21/4402* | (2011.01) |

(52) U.S. Cl.
CPC .............. *H04N 7/0117* (2013.01); *H04N 7/01* (2013.01); *H04N 9/64* (2013.01); *H04N 21/4122* (2013.01); *H04N 21/41407* (2013.01); *H04N 21/4318* (2013.01); *H04N 21/43637* (2013.01); *H04N 21/440263* (2013.01)

(58) Field of Classification Search
USPC ......................................................... 348/571
See application file for complete search history.

(56) References Cited

U.S. PATENT DOCUMENTS

| | | | | |
|---|---|---|---|---|
| 5,794,018 | A * | 8/1998 | Vrviloe ................... | G06Q 10/10 348/E7.082 |
| 8,045,613 | B2 | 10/2011 | Fann | |
| 8,542,265 | B1 * | 9/2013 | Dodd ....................... | H04N 7/15 348/14.08 |
| 9,076,224 | B1 * | 7/2015 | Shah ........................ | G06T 5/009 |
| 2004/0141162 | A1 * | 7/2004 | Olbrich ................... | G06F 3/017 353/119 |
| 2010/0079489 | A1 * | 4/2010 | Cheng ................... | G06T 15/503 345/629 |
| 2011/0018897 | A1 * | 1/2011 | Uchiyama .............. | G03B 21/00 345/619 |
| 2011/0019936 | A1 * | 1/2011 | Bhrugumalla ......... | H04N 5/232 382/298 |
| 2011/0063409 | A1 * | 3/2011 | Hannuksela ......... | H04N 19/597 348/42 |

FOREIGN PATENT DOCUMENTS

TW    200845759    11/2008

OTHER PUBLICATIONS

Office action mailed on Jun. 25, 2015 for the Taiwan application No. 103108247, filing date: Mar. 10, 2014, p. 2 line 21-26, p. 3-4 and p. 5 line 1-20.

* cited by examiner

*Primary Examiner* — Paulos M Natnael
(74) *Attorney, Agent, or Firm* — Winston Hsu; Scott Margo

(57) ABSTRACT

An electronic device includes a display unit; a memory unit; and a processing unit electrically connected to the display unit and the memory unit, the processing unit capturing (N+M) frames displayed by the display unit, N and M being positive integers, the N frames having a first resolution, the M frames having a second resolution, the first resolution being larger than the second resolution, the processing unit converting a color space of the (N+M) frames and encoding the (N+M) frames, the processing unit magnifying a size of each of the M frames to be equal to a size of each of the N frames, the processing unit encapsulating and outputting the (N+M) frames.

13 Claims, 4 Drawing Sheets

ELECTRONIC DEVICE, DISPLAY SYSTEM AND IMAGE PROCESSING METHOD

BACKGROUND OF THE INVENTION

1. Field of the Invention

The invention relates to an electronic device, a display system and an image processing method and, more particularly, to an electronic device, a display system and an image processing method capable of outputting frames to a display device smoothly.

2. Description of the Prior Art

So far lots of electronic devices (e.g. mobile phone, tablet computer, notebook computer, desktop computer, etc.) are equipped with a wireless communication unit (e.g. Wi-Fi module), such that the electronic devices can communicate with a display device (e.g. TV, monitor, projector, etc.) in a wireless manner. Accordingly, a user can output frames displayed by a display unit of the electronic device to other display devices easily and rapidly in a wireless manner, so as to share videos, photos or other multimedia information with his/her family or friends through the display device.

In general, the electronic device will continuously capture frames displayed by the display unit, store the frames into buffer areas of a memory unit, retrieve the frames from the buffer areas, convert a color space of the frames, encode and encapsulate the frames, and then output the frames to the display device. So far the frames captured by the prior art all keep a full resolution of the display unit. However, the calculation efficiency is worse when the frames having the full resolution are used for color space conversion. The frame per second (FPS) maybe about 7 to 10 based on the full resolution of different display units. For the structure and characteristic of human eyes, the human eyes will consider that the frames are continuous only when the FPS is larger than 10 to 12. Therefore, the video displayed by the prior art is usually not smooth enough, such that the user may get a bad feeling on watching the video.

SUMMARY OF THE INVENTION

The invention provides an electronic device, a display system and an image processing method capable of outputting frames to a display device smoothly, so as to solve the aforesaid problems.

According to the claimed invention, an electronic device comprises a display unit, a memory unit and a processing unit. The processing unit is electrically connected to the display unit and the memory unit. The processing unit captures (N+M) frames displayed by the display unit, wherein N and M are positive integers, the N frames have a first resolution, the M frames have a second resolution, and the first resolution is larger than the second resolution. The processing unit converts a color space of the (N+M) frames and encodes the (N+M) frames. The processing unit magnifies a size of each of the M frames to be equal to a size of each of the N frames. The processing unit encapsulates and outputs the (N+M) frames.

According to the claimed invention, the electronic device further comprises a wireless communication unit electrically connected to the processing unit. The wireless communication unit is used to communicate with a display device in a wireless manner. The processing unit outputs the (N+M) frames to the display device through the wireless communication unit.

According to the claimed invention, the first resolution is a full resolution of the display unit, the second resolution is a half resolution of the display unit, and the size of each of the M frames is equal to one-fourth of the size of each of the N frames.

According to the claimed invention, the memory unit comprises (N+M) buffer areas for storing the (N+M) frames.

According to the claimed invention, the processing unit stores the (N+M) frames into the (N+M) buffer areas interlacedly according to the first resolution and the second resolution.

According to the claimed invention, a display system comprises a display device and an electronic device. The electronic device comprises a wireless communication unit, a display unit, a memory unit and a processing unit. The wireless communication unit is used for communicating with the display device in a wireless manner. The processing unit is electrically connected to the wireless communication unit, the display unit and the memory unit. The processing unit captures (N+M) frames displayed by the display unit, wherein N and M are positive integers, the N frames have a first resolution, the M frames have a second resolution, and the first resolution is larger than the second resolution. The processing unit converts a color space of the (N+M) frames and encodes the (N+M) frames. The processing unit magnifies a size of each of the M frames to be equal to a size of each of the N frames. The processing unit encapsulates the (N+M) frames and outputs the (N+M) frames to the display device through the wireless communication unit.

According to the claimed invention, the first resolution is a full resolution of the display unit, the second resolution is a half resolution of the display unit, and the size of each of the M frames is equal to one-fourth of the size of each of the N frames.

According to the claimed invention, the memory unit comprises (N+M) buffer areas for storing the (N+M) frames.

According to the claimed invention, the processing unit stores the (N+M) frames into the (N+M) buffer areas interlacedly according to the first resolution and the second resolution.

According to the claimed invention, an image processing method comprises steps of capturing (N+M) frames displayed by a display unit, N and M being positive integers, the N frames having a first resolution, the M frames having a second resolution, the first resolution being larger than the second resolution; converting a color space of the (N+M) frames and encoding the (N+M) frames; magnifying a size of each of the M frames to be equal to a size of each of the N frames; and encapsulating and outputting the (N+M) frames.

According to the claimed invention, the first resolution is a full resolution of the display unit, the second resolution is a half resolution of the display unit, and the size of each of the M frames is equal to one-fourth of the size of each of the N frames.

According to the claimed invention, the image processing method further comprises step of storing the (N+M) frames into (N+M) buffer areas of a memory unit.

According to the claimed invention, the image processing method further comprises step of storing the (N+M) frames into the (N+M) buffer areas interlacedly according to the first resolution and the second resolution.

As mentioned in the above, parts of the captured frames have larger resolution (e.g. full resolution of the display unit) and the other parts of the captured frames have smaller resolution (e.g. half resolution of the display unit). The calculation efficiency can be improved effectively when the frames having smaller resolution are used for color space conversion, so as to increase the frame per second (FPS).

Accordingly, the electronic device of the invention can output the frames to the display device smoothly. Furthermore, based on the characteristic of persistence of vision, the frames having larger resolution can enable the whole frames to keep good resolution for human eyes. In other words, a video can be displayed smoothly by the invention and the resolution can be kept good simultaneously.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
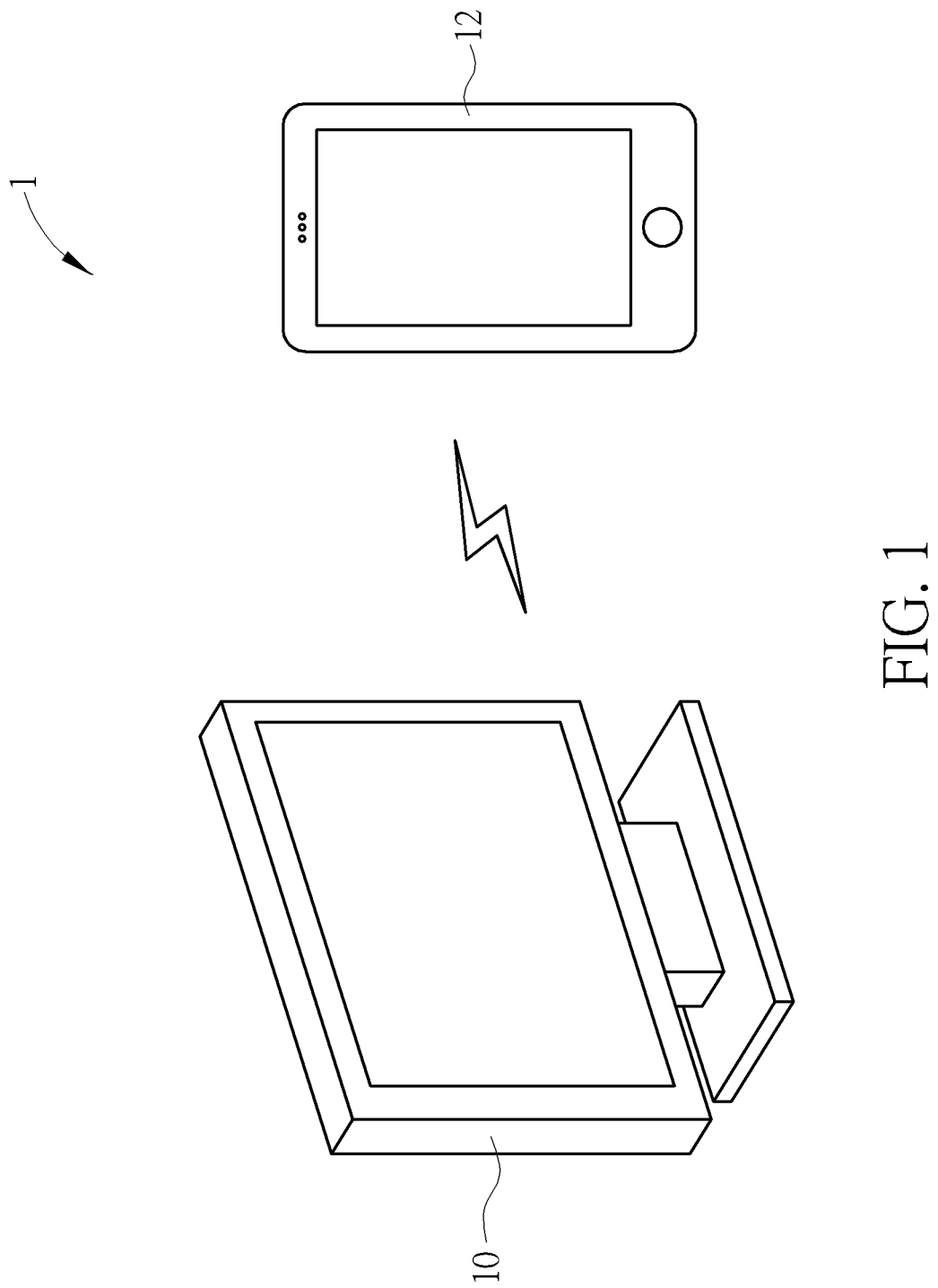
FIG. 1 is a schematic diagram illustrating a display system according to an embodiment of the invention.
Figure 2:
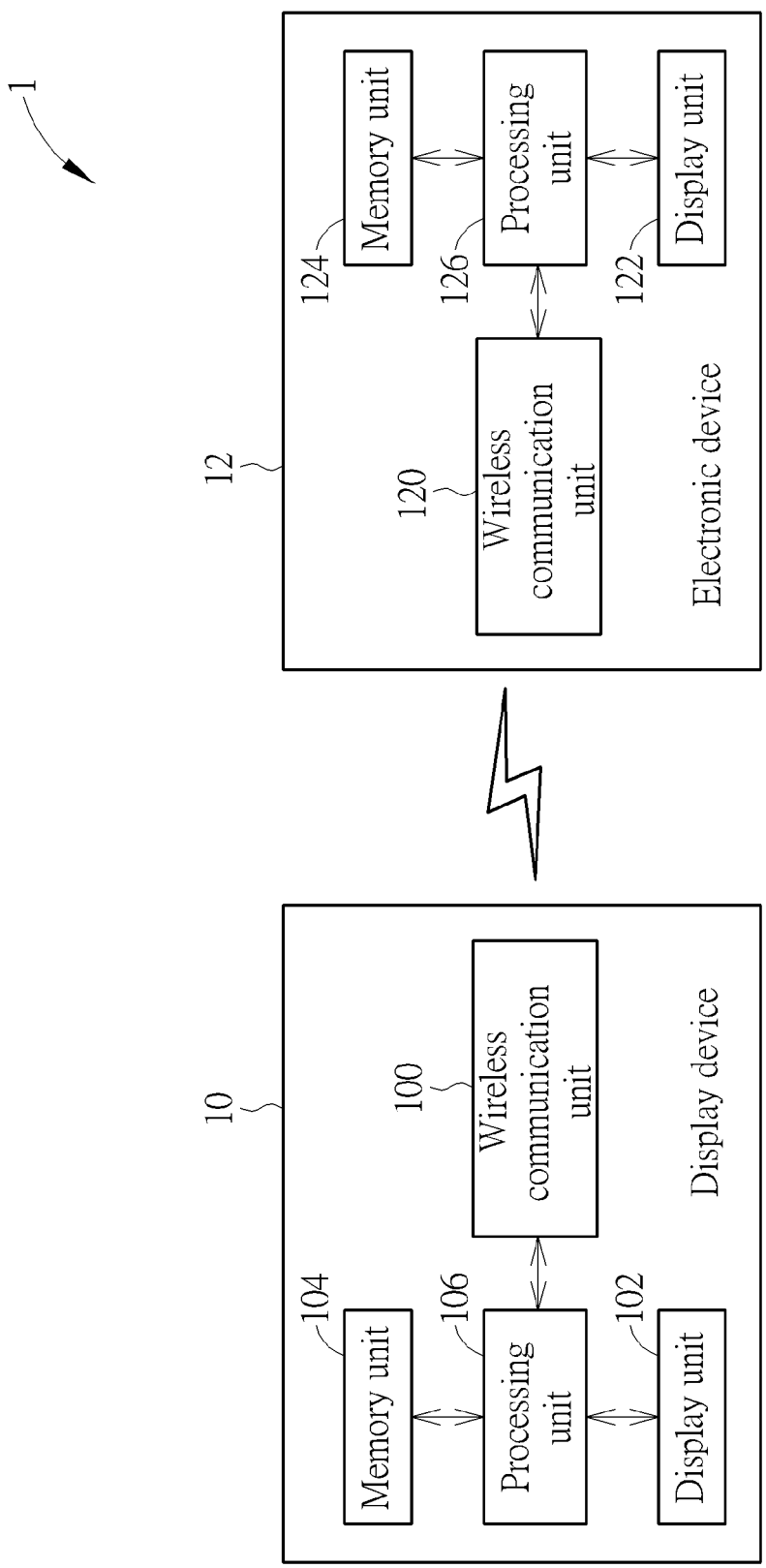
FIG. 2 is a functional block diagram illustrating the display system shown in FIG. 1.
Figure 3:
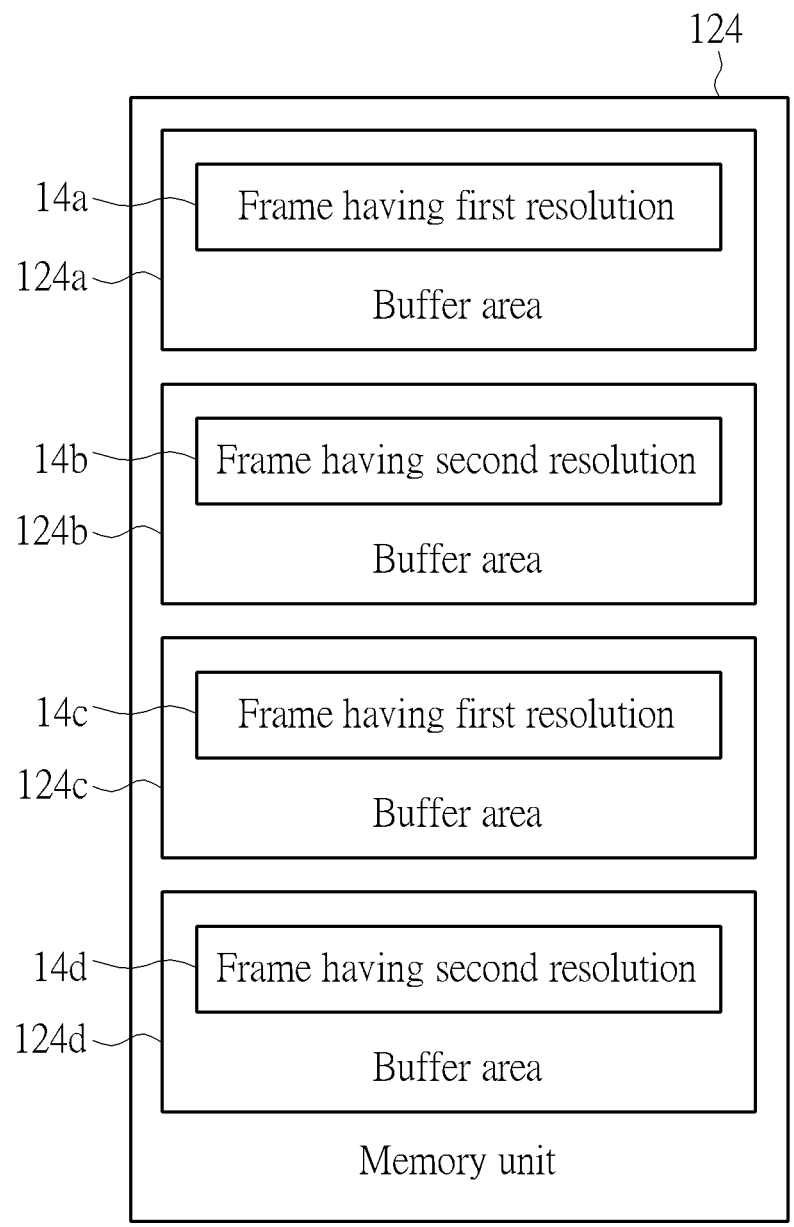
FIG. 3 is a functional block diagram illustrating the memory unit shown in FIG. 2.
Figure 4:
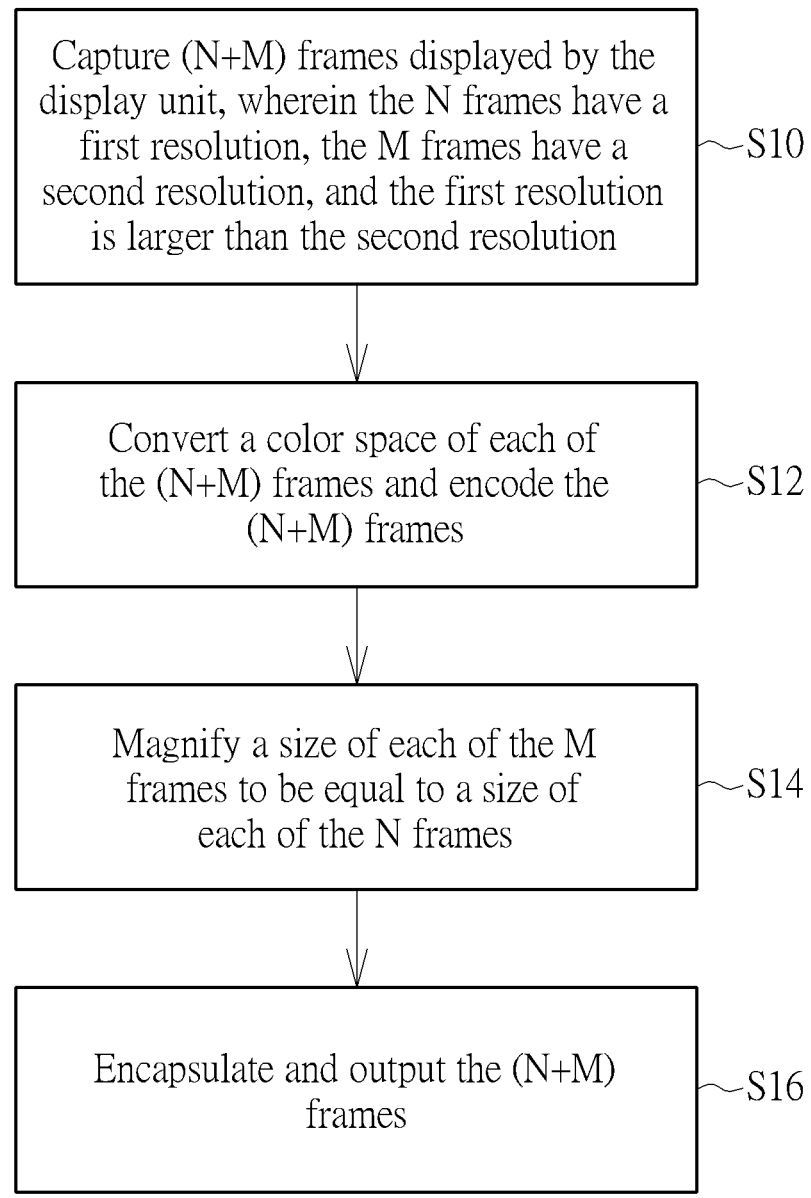
FIG. 4 is a flowchart illustrating an image processing method according to an embodiment of the invention.

Referring to FIGS. 1 to 4, FIG. 1 is a schematic diagram illustrating a display system 1 according to an embodiment of the invention, FIG. 2 is a functional block diagram illustrating the display system 1 shown in FIG. 1, FIG. 3 is a functional block diagram illustrating the memory unit 124 shown in FIG. 2, and FIG. 4 is a flowchart illustrating an image processing method according to an embodiment of the invention. The image processing method shown in FIG. 4 can be implemented by the electronic device 12 shown in FIGS. 1 and 2.

As shown in FIGS. 1 and 2, the display system 1 comprises a display device 10 and an electronic device 12. The display device 10 comprises a wireless communication unit 100, a display unit 102, a memory unit 104 and a processing unit 106, wherein the processing unit 106 is electrically connected to the wireless communication unit 100, the display unit 102 and the memory unit 104. The electronic device 12 comprises a wireless communication unit 120, a display unit 122, a memory unit 124 and a processing unit 126, wherein the processing unit 126 is electrically connected to the wireless communication unit 120, the display unit 122 and the memory unit 124. The wireless communication unit 120 of the electronic device 12 is used for communicating with the wireless communication unit 100 of the display device 10.

In practical applications, the display device 10 may be a TV, monitor, projector, etc.; the electronic device 12 may be a mobile phone, tablet computer, notebook computer, desktop computer, etc.; the wireless communication units 100, 120 may be Wi-Fi modules or other wireless communication modules; the display units 102, 122 may be liquid crystal display devices or other display devices; the memory units 104, 124 may be memories or other storage devices; and the processing units 106, 126 may be processors or controllers with data processing function. In general, the display device 10 and the electronic device 12 may be further equipped with some necessary hardware or software components for specific purposes, such as a power supply, an operating system, applications, an input/output module, etc., and it depends on practical applications.

When a user wants to output frames displayed by the display unit 122 of the electronic device 12 to the display unit 102 of the display device 10 in a wireless manner, the user has to make the display device 10 and the electronic device 12 communicate with each other through the wireless communication units 100, 120 in a wireless manner. Afterward, the processing unit 126 of the electronic device 12 will start to capture frames displayed by the display unit 122 continuously.

In this embodiment, the processing unit 126 captures (N+M) frames displayed by the display unit 122 (step S10 in FIG. 4), wherein N and M are positive integers, the N frames have a first resolution, the M frames have a second resolution, and the first resolution is larger than the second resolution. Furthermore, the memory unit 124 comprises (N+M) buffer areas for storing the (N+M) frames captured by the processing unit 126. Preferably, the processing unit 126 may store the (N+M) frames into the (N+M) buffer areas of the memory unit 124 interlacedly according to the first resolution and the second resolution.

As shown in FIG. 3, the memory unit 124 comprises four buffer areas 124a-124d for storing four frames 14a-14d captured by the processing unit 126, wherein two frames 14a, 14c have the first resolution and the other two frames 14b, 14d have the second resolution. The processing unit 126 stores the four frames 14a-14d into the four buffer areas 124a-124d of the memory unit 124 interlacedly according to the first resolution and the second resolution.

In this embodiment, the first resolution may be a full resolution of the display unit 122 of the electronic device 12 and the second resolution may be a half resolution of the display unit 122 of the electronic device 12. For example, if the full resolution of the display unit 122 of the electronic device 12 is equal to 1280*800, the first resolution is equal to 1280*800 and the second resolution is equal to 640*400 accordingly. At this time, the size of each of the frames 14b, 14d having the second resolution is equal to one-fourth of the size of each of the frames 14a, 14c having the first resolution.

After storing the captured frames 14a-14d into the buffer areas 124a-124d of the memory unit 124 sequentially, the processing unit 126 converts a color space of each of the frames 14a-14d and encodes the frames 14a-14d (step S12 in FIG. 4). Then, the processing unit 126 utilizes a digital magnification algorithm to magnify a size of each of the frames 14b, 14d having the second resolution to be equal to a size of each of the frames 14a, 14c having the first resolution (step S14 in FIG. 4). Finally, the processing unit 126 encapsulates the frames 14a-14d and outputs the frames 14a-14d to the display device 10 through the wireless communication unit 120 (step S16 in FIG. 4). After receiving the frames 14a-14d, the display device 10 stores the frames 14a-14d into the memory unit 104, decodes the frames 14a-14d by the processing unit 106, and displays the frames 14a-14d by the display unit 102. In this embodiment, the processing unit 106 of the display device 10 may determine that each of the received frames 14a-14d has the first resolution or the second resolution according to default indices of the buffer areas 124a-124d or the resolution of each of the frames 14a-14d.

The calculation efficiency can be improved effectively when the frames 14b, 14d having smaller second resolution are used for color space conversion, so as to increase the frame per second (FPS). Through practical experiment, when the second resolution is equal to a half of the first resolution, the FPS of the invention may be increased to be 14 to 17 effectively. Accordingly, the electronic device 12 of the invention can output the frames to the display device 10 smoothly. Furthermore, based on the characteristic of persistence of vision, the frames 14a, 14c having larger first resolution can enable the whole frames to keep good resolution for human eyes. In other words, a video can be displayed smoothly by the invention and the resolution can be kept good simultaneously.

It should be noted that the frames 14b, 14d having the second resolution may be also stored into the buffer areas 124a, 124c and the frames 14a, 14c having the first resolution may be also stored into the buffer areas 124b, 124d. Furthermore, the invention may also utilize one of the buffer areas 124a-124d to store a frame having the first resolution and utilize the other three of the buffer areas 124a-124d to store frames having the second resolution. Moreover, the number of buffer areas of the invention may be adjusted according to practical applications, so the invention is not limited to the embodiment shown in FIG. 3.

It should be noted that the aforesaid embodiment utilizes only four frames 14a-14d to depict the features of the invention. However, after the display device 10 and the electronic device 12 communicate with each other through the wireless communication units 100, 120 in a wireless manner, the electronic device 12 will perform the steps S10-S16 in FIG. 4 repeatedly, so as to output frames displayed by the display unit 122 to the display device 10 smoothly.

Still further, the control logic of the image processing method shown in FIG. 4 can be implemented by software. The software can be executed in any electronic devices with data processing function, such as a mobile phone, a tablet computer, a notebook computer, a desktop computer, etc. Needless to say, each part or function of the control logic may be implemented by software, hardware or the combination thereof.

As mentioned in the above, parts of the captured frames have larger resolution (e.g. full resolution of the display unit) and the other parts of the captured frames have smaller resolution (e.g. half resolution of the display unit). The calculation efficiency can be improved effectively when the frames having smaller resolution are used for color space conversion, so as to increase the frame per second (FPS). Accordingly, the electronic device of the invention can output the frames to the display device smoothly. Furthermore, based on the characteristic of persistence of vision, the frames having larger resolution can enable the whole frames to keep good resolution for human eyes. In other words, a video can be displayed smoothly by the invention and the resolution can be kept good simultaneously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
a display unit having a first resolution;
a memory unit; and
a processing unit electrically connected to the display unit and the memory unit, the processing unit capturing (N+M) frames displayed by the display unit, N and M being positive integers, the N frames having the first resolution, the M frames having a second resolution, the first resolution being larger than the second resolution, the processing unit converting a color space of the (N+M) frames and encoding the (N+M) frames, the processing unit magnifying a size of each of the M frames to be equal to a size of each of the N frames, the processing unit encapsulating and outputting the (N+M) frames.

2. The electronic device of claim 1, further comprising a wireless communication unit electrically connected to the processing unit, the wireless communication unit being used to communicate with a display device in a wireless manner, the processing unit outputting the (N+M) frames to the display device through the wireless communication unit.

3. The electronic device of claim 1, wherein the first resolution is a full resolution of the display unit, the second resolution is a half resolution of the display unit, and the size of each of the M frames is equal to one-fourth of the size of each of the N frames.

4. The electronic device of claim 1, wherein the memory unit comprises (N+M) buffer areas for storing the (N+M) frames.

5. The electronic device of claim 4, wherein the processing unit stores the (N+M) frames into the (N+M) buffer areas interlacedly according to the first resolution and the second resolution.

6. A display system comprising:
a display device; and
an electronic device comprising:
a wireless communication unit for communicating with the display device in a wireless manner;
a display unit having a first resolution;
a memory unit; and
a processing unit electrically connected to the wireless communication unit, the display unit and the memory unit, the processing unit capturing (N+M) frames displayed by the display unit, N and M being positive integers, the N frames having the first resolution, the M frames having a second resolution, the first resolution being larger than the second resolution, the processing unit converting a color space of the (N+M) frames and encoding the (N+M) frames, the processing unit magnifying a size of each of the M frames to be equal to a size of each of the N frames, the processing unit encapsulating the (N+M) frames and outputting the (N+M) frames to the display device through the wireless communication unit.

7. The display system of claim 6, wherein the first resolution is a full resolution of the display unit, the second resolution is a half resolution of the display unit, and the size of each of the M frames is equal to one-fourth of the size of each of the N frames.

8. The display system of claim 6, wherein the memory unit comprises (N+M) buffer areas for storing the (N+M) frames.

9. The display system of claim 8, wherein the processing unit stores the (N+M) frames into the (N+M) buffer areas interlacedly according to the first resolution and the second resolution.

10. An image processing method comprising:
capturing (N+M) frames displayed by a display unit, N and M being positive integers, the display unit having a first resolution, the N frames having the first resolution, the M frames having a second resolution, the first resolution being larger than the second resolution;
converting a color space of the (N+M) frames and encoding the (N+M) frames;
magnifying a size of each of the M frames to be equal to a size of each of the N frames; and
encapsulating and outputting the (N+M) frames.

11. The image processing method of claim 10, wherein the first resolution is a full resolution of the display unit, the second resolution is a half resolution of the display unit, and the size of each of the M frames is equal to one-fourth of the size of each of the N frames.

12. The image processing method of claim 10, further comprising:
- storing the (N+M) frames into (N+M) buffer areas of a memory unit.

13. The image processing method of claim 12, further comprising:
- storing the (N+M) frames into the (N+M) buffer areas interlacedly according to the first resolution and the second resolution.

\* \* \* \* \*